(12) United States Patent
Shinkai et al.

(10) Patent No.: US 7,491,436 B2
(45) Date of Patent: *Feb. 17, 2009

(54) OPTICAL INFORMATION RECORDING MEDIUM

(75) Inventors: Masaru Shinkai, Kanagawa (JP); Michiaki Shinotsuka, Kanagawa (JP); Hiroyuki Iwasa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 129 days.

This patent is subject to a terminal disclaimer.

(21) Appl. No.: 11/246,953

(22) Filed: Oct. 11, 2005

(65) Prior Publication Data

US 2006/0093778 A1 May 4, 2006

Related U.S. Application Data

(63) Continuation of application No. 10/713,187, filed on Nov. 17, 2003, now Pat. No. 7,005,172.

(30) Foreign Application Priority Data

Nov. 18, 2002 (JP) ............................. 2002-334303
Oct. 16, 2003 (JP) ............................. 2003-356483

(51) Int. Cl.
*B32B 3/02* (2006.01)

(52) U.S. Cl. .................. 428/64.4; 428/64.5; 428/64.6; 430/270.13

(58) Field of Classification Search ............... 428/64.1, 428/64.4, 64.5; 430/270.13
See application file for complete search history.

(56) References Cited

U.S. PATENT DOCUMENTS

| 5,534,063 | A | 7/1996 | Maruyama et al. |
|---|---|---|---|
| 5,642,550 | A | 7/1997 | Maruyama et al. |
| 5,736,657 | A | 4/1998 | Ide et al. |
| 6,018,510 | A | 1/2000 | Abe et al. |
| 6,071,587 | A | 6/2000 | Yoshinari et al. |
| 6,096,398 | A | 8/2000 | Yuzurihara et al. |
| 6,221,557 | B1 | 4/2001 | Harigaya et al. |
| 6,300,039 | B1 * | 10/2001 | Ohbayashi et al. ..... 430/270.13 |
| 6,352,753 | B2 | 3/2002 | Nonaka et al. |
| 6,426,936 | B1 | 7/2002 | Shinotsuka et al. |
| 6,677,104 | B2 | 1/2004 | Mizushima et al. |
| 2002/0160141 | A1 | 10/2002 | Shinotsuka |
| 2002/0160306 | A1 | 10/2002 | Hanaoka et al. |
| 2002/0196324 | A1 | 12/2002 | Abe et al. |
| 2003/0003395 | A1 | 1/2003 | Yuzurihara et al. |
| 2003/0012917 | A1 | 1/2003 | Harigaya et al. |
| 2003/0035360 | A1 | 2/2003 | Shinotsuka et al. |

(Continued)

FOREIGN PATENT DOCUMENTS

EP 0 897 177 A1 2/1999

(Continued)

*Primary Examiner*—Elizabeth Mulvaney
(74) *Attorney, Agent, or Firm*—Dickstein Shapiro LLP (57) ABSTRACT

An optical information recording medium comprising a substrate, recording layer and reflecting layer, characterized in that a layer containing a mixture of carbide and oxide is disposed over a surface of the reflecting layer which faces to the recording layer. The carbide is a carbide of at least one metal selected from Ti, Zr, V, Nb, Ta, Cr, Mo and W, and the oxide is an oxide of at least one metal selected from Ti, Zr, V, Nb, Ta, Cr, Mo and W.

6 Claims, 4 Drawing Sheets

U.S. PATENT DOCUMENTS

| | | |
|---|---|---|
| 2003/0081537 A1 | 5/2003 | Shinotsuka |
| 2003/0180495 A1 | 9/2003 | Ito et al. |
| 2003/0180497 A1 | 9/2003 | Kitaura et al. |
| 2003/0190447 A1 | 10/2003 | Kojima et al. |
| 2004/0130998 A1 | 7/2004 | Iwasa et al. |
| 2004/0174796 A1 | 9/2004 | Mizushimia et al. |

FOREIGN PATENT DOCUMENTS

| | | |
|---|---|---|
| EP | 1 065 663 A2 | 1/2001 |
| EP | 1 148 148 A1 | 10/2001 |
| EP | 1 193 696 A2 | 4/2002 |
| EP | 1 343 155 A2 | 9/2003 |
| EP | 1 372 148 A2 | 12/2003 |
| JP | 10-208299 | 8/1998 |
| JP | 2002-269823 | 9/2002 |
| JP | 2002-293032 | 10/2002 |
| JP | 2002-301869 | 10/2002 |
| JP | 2004185794 | 7/2004 |
| WO | WO 03/025924 | 3/2003 |

* cited by examiner

OPTICAL INFORMATION RECORDING MEDIUM

This application is a continuation of application Ser. No. 10/713,187, filed Nov. 17, 2003 now U.S Pat. No. 7,005,172, which is hereby incorporated by reference in its entirety.

BACKGROUND OF THE INVENTION

1. Field of the Invention

The present invention relates to an optical information recording medium capable of recording and reproducing information at high speed and high density by an optical means, such as laser, more particularly a barrier layer for preventing deterioration of the medium as a result of the reactions of the reflecting layer with the dielectric protective layer and a chalcogen-based component in the recording layer, when a highly thermoconductive material of Ag or with Ag as the major ingredient is used for the reflecting layer for high-speed recording, and applicable to and developable in the fields which need weather resistance of molded metallic shapes or metallic films.

2. Description of the Related Art

Of the recording-type optical disks, the one depending on phase change in general is basically and functionally structured by 4 layers, for example, plastic substrate/dielectric material/chalcogen-based, phase-change recording material/dielectric material/cooling/reflecting layer of Al- or Ag-based alloy, where the chalcogen-based phase-change recording material takes the crystalline or amorphous structure depending on temperature to which it is exposed, and information recorded can be recognized by the resulting difference in reflectivity.

Recently, the recording-type optical disks depending on phase-change have been frequently used, which increasingly needs higher density for recording and higher linear velocity of writing.

Various proposals have been made for increasing recording density. One example of these proposals uses semiconductor laser beams of short wavelength and large numerical aperture (NA) of the optical pick-up to narrow down the recording laser beams for high-density recording (International Publication No. WO99/00794, Claims 9 to 11 in page 2, line 21 to page 3, line 3, and page 10, line 9 to line 12).

For increasing linear writing velocity, the reflecting layer plays a vital role. It is required to keep high reflectivity and rapidly cool down, and is in many cases made of a material of high thermoconductivity, e.g., Ag, Au or Cu, in particular Ag.

However, Ag as a reflecting layer material involves problems because of its chemical sensitivity to non-metallic elements, e.g., chlorine and oxygen, and their ions, resulting in contamination therewith and insufficient weather resistance in the environment or atmosphere in which the recording medium is used.

One of the proposed techniques to solve the above problems is doping Ag with a metallic element as an impurity. More specifically, it is doped with 0.1% to 5.0% of Au as an impurity and another specific metallic element also as an impurity (Japanese Patent Application Laid-Open (JP-A) No. 2002-129260, Claims, page 2, column 1, line 1 to line 24).

When at least an Ag-based material is used as a constituent material for the reflecting layer, on the other hand, there are basic problems arising in relation to the other layers.

The important considerations for the dielectric layer materials are thermal, optical and productivity-related properties (e.g., film-forming rate), and $ZnS/SiO_2$ (80/20 by mol) has been extensively used because it satisfies these requirements.

However, it is known that a metal of high reflectivity and thermoconductivity, such as Ag, Au or Ag-based one, for the cooling/reflecting layer causes characteristic problems of corrosion by sulfur, when the dielectric layer contains sulfur. These problems are particularly noted with an Ag-based material.

One of the proposals for preventing corrosion of the reflecting layer of Ag is placing an intermediate layer between the dielectric layer containing sulfur atom and reflecting layer containing Ag as the major ingredient, where the intermediate layer is formed of oxide, nitride or carbide of a metal or semiconductor, or amorphous carbon. (Japanese Patent Application Laid-Open (JP-A) No. 11-238253, Claim 1, page 2, column 1, line 2 to line 11, and paragraph [0046], page 7, column 12, line 45 to page 8, column 13, line 1).

Another proposal for preventing sulfidation of the reflecting layer material is placing a barrier layer between the dielectric and reflecting layers in a manner similar to that proposed by the above-mentioned patent document JP-A No. 11-238253, where the barrier layer is formed of nitride, oxide, carbide or oxynitride of an element α (α is at least one element selected from Sn, In, Zr, Si, Cr, Al, Ta, V, Nb, Mo, W, Ti, Mg and Ge) (Japanese Patent Application Laid-Open (JP-A) No. 2002-74746, Claim 1, page 2, column 1, line 2 to line 11, and Claim 6, page 2, column 1, line 23 to line 25).

However, the intermediate layer proposed by JP-A Nos. 11-238253, and 2002-74746 involves its own problems.

The barrier layer of oxide involves productivity-related problems, because of its lower film-forming rate than that associated with the dielectric layer of $ZnS/SiO_2$ where ZnS is 80% by mol and $SiO_2$ is 20% by mol, which has been extensively used.

The inventors of the present invention have confirmed, based on the tests carried out by themselves, that it is formed at a film-forming rate of 1/15} to 1/3 that of the dielectric layer of $ZnS/SiO_2$ formed using the same apparatus by RF sputtering, and 3/5 to 4/5 that of the reflecting layer material formed by DC sputtering, indicating that it is much lower in productivity than that of $ZnS/SiO_2$.

In the case of the barrier layer of nitride, its film-forming rate is 1/12 to 4/5 that of $ZnS/SiO_2$ layer, the upper limit being slightly higher than that of the oxide-based layer.

However, particularly noted is its optical constant k value, roughly by 1 to 4 digits higher than that of the oxide-based layer. This, in turn, conceivably causes the problems of decreased reflectivity and sensitivity for the recording medium signals, requiring higher writing power.

The barrier layer of carbide-based material has an optical constant k value higher than that of the oxide-based one, as is the case with the nitride-based one, with the result that its reflectivity for the recording medium signals decreases, deteriorating its sensitivity.

Moreover, a carbide-based material is extensively used for molds for pressed glass lenses or mold surface layers. Therefore, it is conceivably insufficient in adhesion to a chalcogenide-based material for the recording layer or to a dielectric layer material similar to glass material in many cases.

Moreover, the carbide-based layer, although high in resistance to thermal shock, is generally high in thermal conductivity to dissipate energy power from the semiconductor laser to the reflecting layer via the carbide layer, which conceivably increases required writing power. This limits thickness of the film.

When laser beams of short wavelength (e.g., 405 nm) are used to increase recording density, optical constant n or k of the dielectric or barrier layer varies with the wavelength, generally tending to increase as the wavelength decreases.

For each of the optical information recording medium layers to have a similar optical thickness for high-density recording after it is actually formed, it is necessary to be sufficiently thin. However, in particular the barrier layer should physically have a certain thickness to prevent pinholes or mass diffusion therein, and may encounter problems of being difficult in exhibiting its functions when it is excessively thin.

Advantages and Objects

It is therefore an object of the present invention to provide an optical information recording medium good in disk characteristics to cope with demands for recording at high linear velocity and sensitivity, and, at the same time, excellent in can-stability.

It is another object of the present invention to provide an optical information recording medium exhibiting an effect of preventing sulfidation-caused corrosion of the reflecting layer, in particular that of an Ag-based material, and keeping production efficiency and also recording characteristics as an optical disk.

SUMMARY OF THE INVENTION

The first aspect of the present invention is an optical information recording medium having a substrate, a recording layer, a reflecting layer and a layer containing a mixture of carbide and oxide, where the layer containing a mixture is disposed to position between the reflecting layer and the recording layer. Here, the carbide is a carbide of at least one metal selected from Ti, Zr, V, Nb, Ta, Cr, Mo and W, and the oxide is an oxide of at least one metal selected from Ti, Zr, V, Nb, Ta, Cr, Mo and W, and the carbide and the oxide may be each of the identical metal or one or more different metals.

The second aspect of the present invention is the optical information recording medium of the first aspect having a substrate which is transparent, a first dielectric layer disposed above the substrate, the recording layer disposed above the first dielectric layer, a second dielectric layer disposed above the recording layer, a barrier layer disposed above the second dielectric layer and the reflecting layer above the barrier layer, wherein the barrier layer is the layer containing a mixture of carbide and oxide. Here, the carbide is a carbide of at least one metal selected from Ti, Zr, V, Nb, Ta, Cr, Mo and W, and the oxide is an oxide of at least one metal selected from Ti, Zr, V, Nb, Ta, Cr, Mo and W.

The third aspect of the present invention is the optical information recording medium of the first aspect having the substrate which is transparent or opaque, the reflection layer disposed above the substrate, a barrier layer disposed above the reflecting layer, a second dielectric layer disposed above the barrier layer; the recording layer disposed above the second dielectric layer, and a first dielectric layer disposed above the recording layer, wherein the barrier layer is the layer containing a mixture of carbide and oxide. Here, the carbide is a carbide of at least one metal selected from Ti, Zr, V, Nb, Ta, Cr, Mo and W, and the oxide is an oxide of at least one metal selected from Ti, Zr, V, Nb, Ta, Cr, Mo and W.

The fourth aspect of the present invention is the optical information recording medium of the first aspect having the substrate which is transparent, a first dielectric layer disposed above the substrate, the recording layer disposed above the first dielectric layer, a second dielectric layer disposed above the recording layer and the reflecting layer above the second dielectric layer, wherein the second dielectric layer is the layer containing a mixture of carbide and oxide. Here, the carbide is a carbide of at least one metal selected from Ti, Zr, V, Nb, Ta, Cr, Mo and W, and the oxide is an oxide of at least one metal selected from Ti, Zr, V, Nb, Ta, Cr, Mo and W.

The fifth aspect of the present invention is the optical information recording medium of the first aspect having the substrate which is transparent or opaque, the reflecting layer disposed above the substrate, a second dielectric layer disposed above the reflecting layer, the recording layer disposed above the dielectric layer and a first dielectric layer disposed above the recording layer, wherein the second dielectric layer is the layer containing a mixture of carbide and oxide where the carbide is a carbide of at least one metal selected from Ti, Zr, V, Nb, Ta, Cr, Mo and W, and the oxide is an oxide of at least one metal selected from Ti, Zr, V, Nb, Ta, Cr, Mo and W.

The sixth aspect of the present invention is the optical information recording medium of the first aspect, wherein the reflecting layer contains Ag as the major component.

The seventh aspect of the present invention is the optical information recording medium of the first aspect, wherein the carbide has a melting point of 550° C. or higher.

The eighth aspect of the present invention is the optical information recording medium of the second aspect, wherein the barrier layer is a thickness of 2 nm to 10 nm.

The ninth aspect of the present invention is the optical information recording medium of the third aspect, wherein the barrier layer is a thickness of 2 nm to 10 nm.

The tenth aspect of the present invention is the optical information recording medium of the first aspect, wherein the recording layer contains a phase-change recording material which is formed of a film of metal selected from Cu, Cr and Ti.

The eleventh aspect of the present invention is the optical information recording medium of the first aspect, wherein the recording layer contains a phase-change recording material which contains at least SbTe of near eutectic composition with Sb and Te each in the following range: $70 \leq Sb \leq 80$ and $20 \leq Te \leq 30$.

The twelfth aspect of the present invention is the optical information recording medium of the first aspect, wherein the recording layer contains a phase-change recording material which contains a single substance or mixture of GeTe and $Sb_2Te_3$.

The thirteenth aspect of the present invention is the optical information recording medium of the first aspect, wherein the mixture of carbide and oxide has a composition ratio of carbide to oxide being from 90/10 to 25/75 in terms of % by weight.

The fourteenth aspect of the present invention is the optical information recording medium of the thirteenth aspect, wherein the mixture of carbide and oxide has a composition ratio of carbide to oxide being from 80/20 to 50/50 in terms of % by weight.

The fifteenth aspect of the present invention is the optical information recording medium of the first aspect having the transparent substrate on the side from where an incident light is applied, and at least two or more sets of the recording layer and the reflecting layer.

The sixteenth aspect of the present invention is the optical information recording medium of the fifteenth aspect having the transparent substrate, a first dielectric layer, the recording layer, a second dielectric layer, a barrier layer, and the reflecting layer in this order, and above them, one or more sets of layers of the first dielectric layer, the recording layer, the second dielectric layer, the barrier layer, and the reflecting layer. In this aspect, each barrier layer is the layer containing a mixture of carbide and oxide, where the carbide is a carbide of at least one metal selected from Ti, Zr, V, Nb, Ta, Cr, Mo and W, and the oxide is an oxide of at least one metal selected from Ti, Zr, V, Nb, Ta, Cr, Mo and W.

The seventeenth aspect of the present invention is the optical information recording medium of the fifteenth aspect having a first substrate on the side from where an incident light is applied, and a second substrate on the opposite side to where an incident light applied. Between the first substrate and the second substrate, several layers are disposed. On the first substrate, there are disposed a first dielectric layer, the recording layer, a second dielectric layer, a barrier layer, and the reflecting layer in this order. On the second substrate towards the first substrate, there are disposed a reflecting layer, a barrier layer, a second dielectric layer, recording layer, and a first dielectric layer. In this aspect, each barrier layer is the layer containing a mixture of carbide and oxide, where the carbide is a carbide of at least one metal selected from Ti, Zr, V, Nb, Ta, Cr, Mo and W, and the oxide is an oxide of at least one metal selected from Ti, Zr, V, Nb, Ta, Cr, Mo and W.

The eighteenth aspect of the present invention is the optical information recording medium of the first aspect, wherein the layer containing a mixture of carbide and oxide is a layer being obtainable with sputtering of a carbide target in an inert atmosphere incorporated with oxygen, and/or a layer being obtainable with sputtering of a mixed carbide/oxide target in an inert atmosphere.

The nineteenth aspect of the present invention is the optical information recording medium of the eighteenth aspect, wherein the layer containing a mixture of carbide and oxide is a layer being obtainable with sputtering of the mixed carbide/oxide target in an inert atmosphere, in which a ratio of carbide target to oxide target is from 90/12 to 25/75 in terms of % by weight.

The twentieth aspect of the present invention is the optical information recording medium of the eighteenth aspect, wherein the target has a resistivity of 0.5 $\Omega$cm or less.

The twenty-first aspect of the present invention is a process for forming an optical information recording medium having a step of disposing at least a recording layer, a reflecting layer and a layer containing a mixture of carbide and where the carbide is a carbide of at least one metal selected from Ti, Zr, V, Nb, Ta, Cr, Mo and W, and the oxide is an oxide of at least one metal selected from Ti, Zr, V, Nb, Ta, Cr, Mo and W, wherein the step of disposing further has at least one of: sputtering with a carbon target in an inert atmosphere incorporated with oxygen; and sputtering with a mixed carbide/oxide target in an inert atmosphere. As a result of this step, the layer containing a mixture of carbide and oxide is disposed to position between the reflecting layer and the recording layer.

The twenty-second aspect of the present invention is the process of the twenty-first aspect, wherein the step of disposing has sputtering with a carbon target in an inert atmosphere incorporated with oxygen.

The twenty-third aspect of the present invention is the process of the twenty-first aspect, wherein the target has a resistivity of 0.5 $\Omega$cm or less, and the sputtering is DC discharge sputtering or DC discharge sputtering with a pulsed waveform.

BRIEF DESCRIPTION OF THE DRAWINGS

FIGS. 3A and 3B are explanatory diagrams of EXAMPLE 4 and COMPARATIVE EXAMPLE 4, where FIG. 3A illustrates a single body of SiC sputtered with Ar, and FIG. 3B illustrates TiC sputtered with a mixture of Ar and $O_2$.

DESCRIPTION OF THE PREFERRED EMBODIMENTS

The present invention is an optical information recording medium comprising a substrate, recording layer and reflecting layer characterized in that a layer containing a mixture of carbide and oxide is disposed on the reflecting layer on the recording layer side. Each carbide and oxide is of at least one metal selected from Ti, Zr, V, Nb, Ta, Cr, Mo and W, and they may be of the identical metal or one or more different metals. The optical information recording medium of the present invention may include any other layer provided that prohibiting the effect of the present invention. The reflecting layer and recording layer may come into contact with each other via the layer containing a mixture of carbide and oxide of at least one metal selected from Ti, Zr, V, Nb, Ta, Cr, Mo and W. Moreover, another layer may be placed between these layers. One of the preferred embodiments of the present invention contains the substrate, a first dielectric layer, the recording layer, a second dielectric layer and the reflecting layer in this order. Moreover, a barrier layer containing a mixture of carbide and oxide of at least one metal selected from Ti, Zr, V, Nb, Ta, Cr, Mo and W is provided on the second dielectric layer on the side coming into contact with the reflecting layer. Another preferred embodiment of the present invention contains a transparent substrate and at least two or more sets of the recording layer and the reflecting layer, in which the substrate is disposed on the side from where an incident light is applied. Yet another preferred embodiment of the present invention contains the transparent substrate from where an incident light is applied, and at least one, preferably two or more sets of layers: the first dielectric layer; the recording layer; the second dielectric layer; the barrier layer; and the reflecting layer, respectively. The inventors of the present invention have found that the above structures can solve the above problems, achieving the present invention.

Corrosion of the reflecting layer by a chalcogen compound present in the recording layer as one of the problems to be solved by the present invention can be also prevented by composing the second dielectric layer totally with a mixture of carbide and oxide of at least one metal selected from Ti, Zr, V, Nb, Ta, Cr, Mo and W.

The present invention can exhibit its effect irrespective of material constituting the reflecting layer, even when it is Al. It exhibits a notable effect for corrosion prevention, particularly when the reflecting layer is composed mainly of Ag for increasing linear writing velocity, which needs rapid quenching to make the recording layer material amorphous.

A layer containing a single substance of carbide is less adhesive to the second dielectric layer and reflecting layer of metallic Ag than the layer containing a carbide/oxide mixture for the present invention. Moreover, the layer containing the single substance may cause floated films or separated films at the interface to an extensive extent during a storage life test in which it is exposed to high temperature and humidity. At the same time, a thin film of single substrate of carbide involves problems resulting from higher optical constant k, which may cause decreased reflectivity and sensitivity for the recording medium signals, requiring higher writing power.

On the other hand, a layer containing a single substance of oxide, although low in optical constant k and advantageous viewed from recording sensitivity, involves a problem of decreased productivity resulting from its low film-forming rate, as discussed earlier.

It is particularly preferable that the barrier layer or second dielectric layer for use in the present invention has a melting point of 550° C. or higher, because it increases in temperature to melting point of the recording material when recorded information is erased.

The process for producing the optical information recording medium of the present invention contains at least one of the following steps 1) and 2), though it is not limited thereto. One step contains 1) sputtering with a mixed target of carbide and oxide in an inert atmosphere so as to form a barrier layer containing a mixture of carbide and oxide, and the other step contains 2) sputtering with a target of carbide in an inert atmosphere incorporated with oxygen so as to form a barrier layer containing a mixture of carbide and oxide.

In the case that the barrier layer containing a mixture of carbide and oxide is formed with the step of (2), sputtering with the single carbide target which is generally low in resistivity is performed by DC discharge sputtering or DC discharge sputtering with a pulse wave form. The resistivity of 0.5 Ωcm or less is particularly preferable. A mixed target of carbide and oxide can be also used without causing any problem, so long as it keeps its resistivity of 0.5 Ωcm or less. A target having a resistivity of more than 0.5 Ωcm may frequently cause abnormal discharge, possibly making it difficult to normally form the film.

The formed barrier layer preferably has a thickness of 3 nm to 20 nm. The excessively thin barrier layer may not effectively function as the barrier layer, to prevent diffusion between the reflecting layer and the second dielectric layer being in contact with the reflecting layer via the barrier layer, or between the reflecting layer and the recording layer. On the other hand, the excessively thick barrier layer may cause deteriorated sensitivity of the optical disk, because it is more absorptive than a single oxide material.

The material for the recording layer for the optical information recording medium of the present invention may be selected from the known phase-change materials. However, it particularly preferably contains at least SbTe of near eutectic composition, viewed from high-speed recording and erasing, where the SbTb of near eutectic composition contains Sb and Te in the following range: $70 \leqq Sb \leqq 80$ and $20 \leqq Te \leqq 30$.

Figure 1:
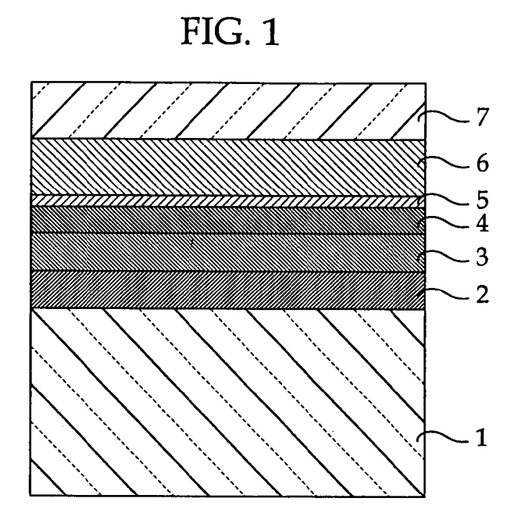
FIG. 1 is a schematic diagram showing an example of structure of the optical information recording medium of the present invention.
Figure 2:
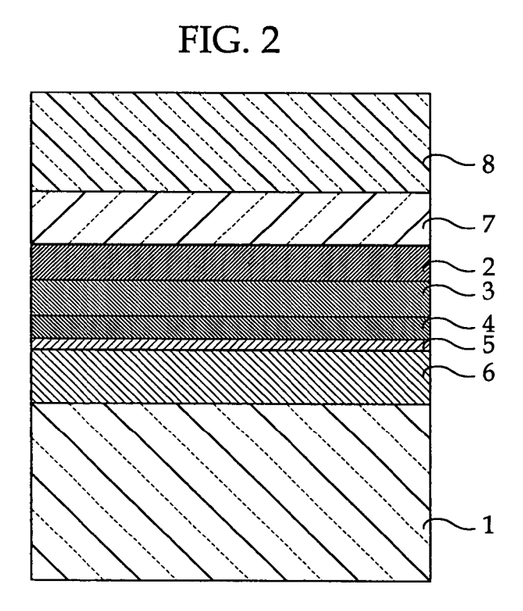
FIG. 2 is a schematic diagram showing another example of structure of the optical information recording medium of the present invention.

The optical information recording medium of the present invention is not limited in its structure. FIG. 1 illustrates one embodiment of laminate structure of the optical information recording medium of the present invention, where the lower dielectric layer (first dielectric layer) 2, the recording layer 3, the upper dielectric layer (second dielectric layer) 4, the barrier layer 5, the reflecting layer 6 and the overcoat protective layer 7 are disposed on the substrate 1 in this order. The material for the barrier layer 5 can keep optical constant n or k at a low level in a short wavelength region in which the recording medium works to secure high-density recording, and is applicable to the surface recording structure shown in FIG. 2 with the reflecting layer 6, the barrier layer 5, the second dielectric layer 4, the recording layer 3 and the first dielectric layer 2 disposed on the substrate in the reversed order. The substrate may be transparent or opaque. The recording layer may be provided with the overcoat, protective layer 7 and cover film 8.

The barrier layer 5 may be dispensed with, when the whole body of the second dielectric layer is formed of a mixture of carbide and oxide of at least one metal selected from Ti, Zr, V, Nb, Ta, Cr, Mo and W.

The followings will explain the reason why sufficient effects can be exhibited with a layer containing a mixture of carbide and oxide as in the present invention and insufficient effects are exhibited with a layer containing a single substance of carbide or oxide as in the conventional methods.

Resistivity and thermoconductivity are generally correlated with each other: a material of low resistivity tends to be high in thermoconductivity, and so is vice versa. The barrier layer or second dielectric layer in contact with the reflecting, heat radiating layer greatly affect the optical recording and erasing characteristics with laser beams.

A material of high thermoconductivity works to rapidly quench the phase-change recording material when it is irradiated with laser beams, increasing mark recording velocity and making the mark edges sharper. However, it involves a disadvantage of increasing required laser power for melting the phase-change recording material.

A material of low thermoconductivity, on the other hand, exhibits effects of improving sensitivity of the phase-change recording material and power margin, because it allows the medium to record at a low power. However, it involves disadvantages of dissipating heat when the phase-change recording material is molten to form the recording marks, being difficult to form a sharp periphery around the amorphous recording mark, deteriorating jitter characteristics, and accelerating heat-caused deterioration of the phase-change recording material.

As discussed above, the barrier layer or second dielectric layer in contact with the reflecting, heat radiating layer needs a vital role in securing the recording/erasing characteristics.

The favorable effect of the carbide/oxide mixture for easily securing the good recording/erasing characteristics for the present invention results from controllability of thermoconductivity, in particular fine controllability of the mixing ratio being considered to be effective for controlling thermoconductivity. Moreover, thermoconductivity can be controlled by process measures with introduction of oxygen, which dispenses with necessity for preparing the target for every sputtering step.

More specifically, a single substance of carbide is low in resistivity and makes the dielectric layer excessively high in thermoconductivity, increasing power requirement for phase-change recording and erasing, and hence narrowing power margin.

On the other hand, a single substance of oxide, although not suffering the problems observed with a single carbide case, involves production-related disadvantages resulting from insufficient film-forming rate. Therefore, it needs a longer production time for which the substrate is exposed to the plasma, increasing its temperature to deteriorate its mechanical properties.

By contrast, the barrier or dielectric layer of the present invention, containing a carbide/oxide mixture, will not have an excessively decreased resistivity, and hence can secure power margin. Moreover, it is formed into a film at a higher rate than that of a single oxide, reducing the production-related disadvantages involved in the latter.

The dielectric containing a carbide/oxide mixture for the optical information recording medium of the present invention preferably has a composition ratio of carbide to oxide being from 90/10 to 25/75 in terms of % by weight.

The composition containing the carbide at above 90% by weight tends to deteriorate the effect of the present invention for preventing floated films or separated films at the interface.

At below 25% by weight, on the other hand, the film can be formed by RF sputtering alone and hence film-forming rate tends to decrease.

It should be noted that DC sputtering can form the film roughly 2 times faster than RF sputtering.

Figure 4:
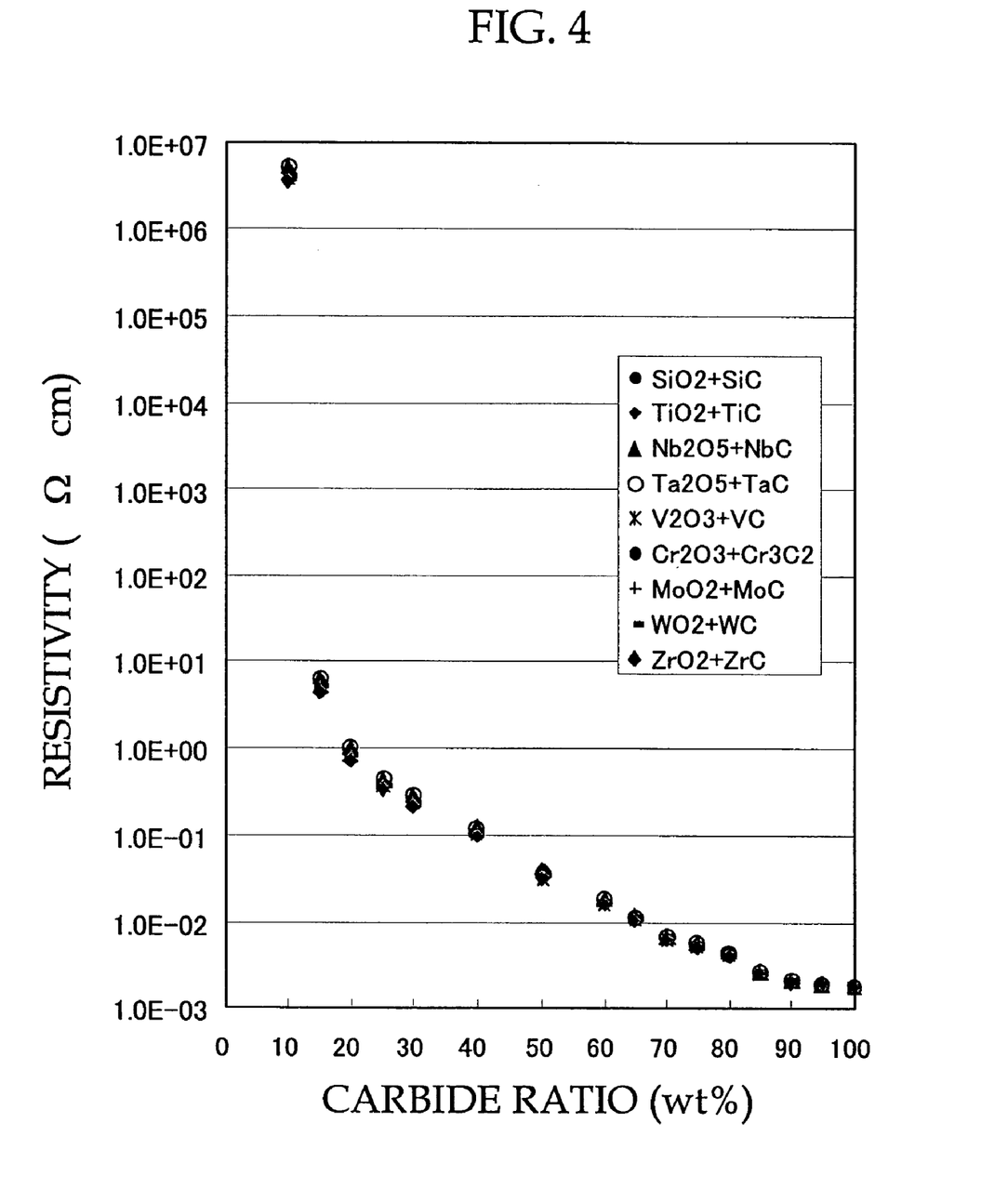
FIG. 4 illustrates resistivity of the target.

Moreover, the composition containing the oxide at below 10% by weight will have properties critically close to the inherent properties of the oxide, and may be difficult to form the uniform laminate structure, because of rapidly varying thermoconductivity. As shown in FIG. 4, which illustrates target resistivity under the target conditions, resistivity rapidly increases at an oxide content below 10% by weight.

The composition containing the oxide at 20% by weight can be formed into a film by DC sputtering, but may produce an arc between the target and sputtering electrode.

The composition ratio of the carbide/oxide mixture in a layer containing the carbide and oxide can be measured by Auger Electron Spectroscopy, for example using an Auger electron spectroscope SAM-660 of Ulvac-Phi, Inc. This measurement is gained its accuracy by using a calibration curve. For the calibration curve, a measuring result is used in which a sample containing a predetermined composition ratio such as a spattering target is previously measured at three or more points thereon. When the composition ratio is calculated, it should be considered that more oxygen atoms are detected with respect to carbon atoms at a proportion of the composition ratio to metals. In the case of TiC and $TiO_2$, for instance, there are two oxygen atoms with respect to one metal Ti so that the quantity of the composition should be calculated as a half of the detected quantity.

When the oxygen introducing method, i.e., sputtering in an inert gas incorporated with oxygen, is applied, the quantity of composition of oxide is determined by the quantity of oxygen. When a film formation is performed using a mixed target in an atmosphere of only an inert gas without oxygen, loss of oxygen is less observed from the formed film, and the composition ratio of the formed film is corresponded to that of the target. This is because a film where is thin, likewise in the case of the present invention, can form within a short period of time without applying a high power and elevating temperature of a substrate.

It tends to cause abnormal discharge when treated by DC discharge sputtering or DC discharge sputtering with a pulsed waveform unless target resistivity is 0.5 Ωcm or less under the target conditions.

As shown in FIG. 4, it is necessary for the composition to contain the carbide at 25% by weight or more to secure target resistivity at 0.5 Ωcm under the target conditions, although it varies to some extent depending on its material.

The dielectric containing a carbide/oxide mixture for the optical information recording medium of the present invention preferably has a composition represented by carbide/oxide ratio of 80/20 to 50/50 by weight, when formed into the film.

$ZnS/SiO_2$ as a representative dielectric for optical information recording media is formed into a film at around 2 to 2.2 nm/kW. The film-forming rate for the present invention is preferably a level not far from the above level, viewed from balanced production time among the production steps. It is preferably at least half of the above level, from which the mixed composition preferably contains the carbide at 50% or more.

Figure 5:
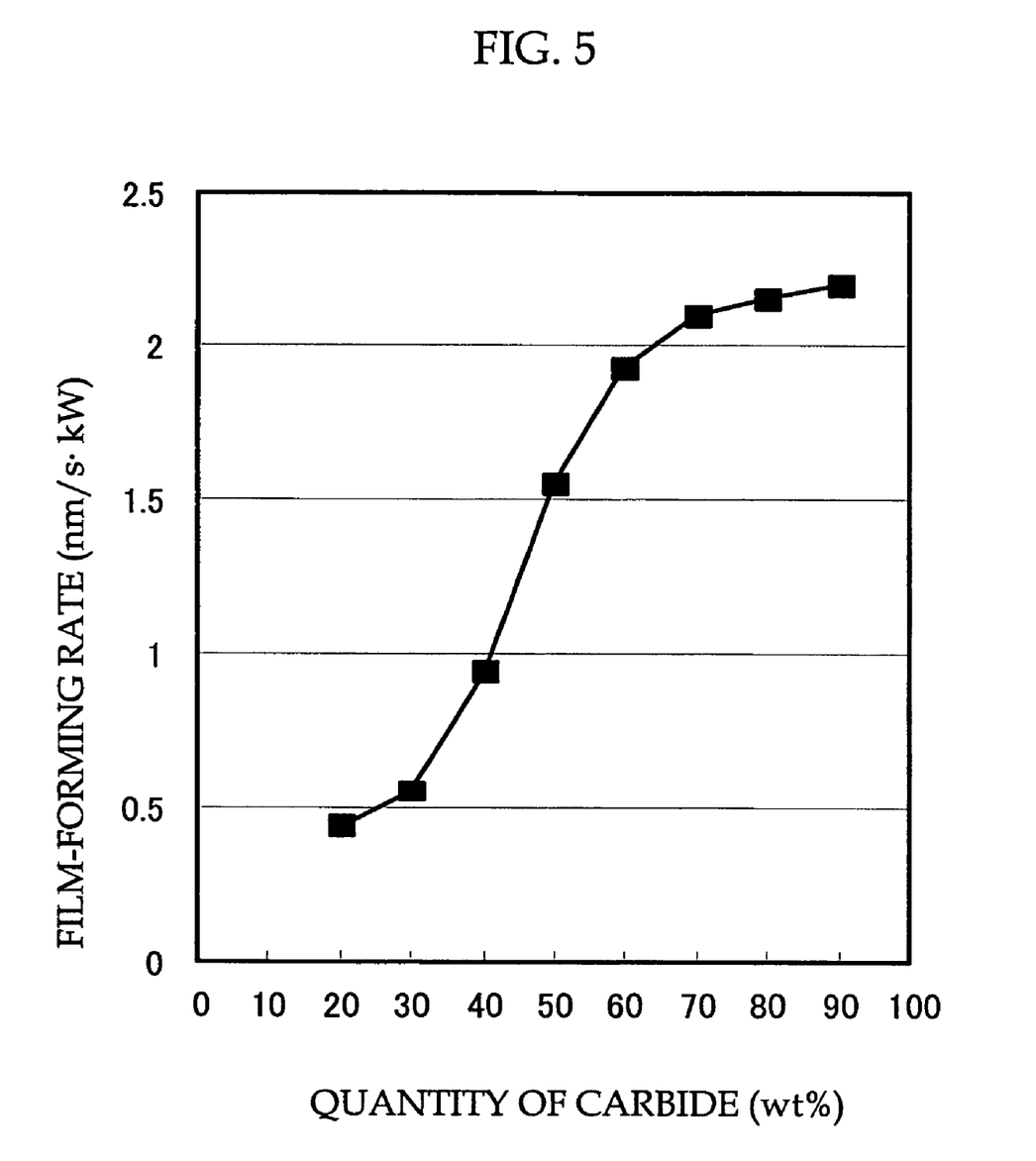
FIG. 5 illustrates tendency of the film-forming rate.

FIG. 5 illustrates the relationship between the film-forming rate and carbide content of the mixed composition.

The materials for the recording layer are not limited to SbTe of near eutectic composition, but include phase-change recording materials of GeTb and $Sb_2Te_3$, either individually or in combination, and inorganic recording materials containing a metal (e.g., Cu, Cr or Ti) or semi-metal (e.g., Si), which are not harmful to the object of the present invention so long as the reflecting layer contains Ag, viewed from the object of the barrier layer for the present invention.

The present invention is described more specifically by EXAMPLES, which by no means limit the present invention.

EXAMPLE 1

<Example for Forming the Barrier Layer with a Mixed Carbide/Oxide Target>

The substrate was a 0.6 mm thick polycarbonate plastic substrate, molded by a Ni stamper provided with groove information of the optical disk. It was laminated with the optical disk layers one by one by a magnetron sputtering apparatus for producing multi-layered films, provided with a film-forming chamber or a number of film-forming targets.

First, the substrate was disposed with the first dielectric layer, approximately 75 nm thick and formed of 80 mol % of ZnS and 20 mol % $SiO_2$.

Next, it was further disposed with a 15 nm thick AgInGeSbTe layer ($Ag_{11}In_3Ge_3Sb_{70}Te_{23}$) as the phase-change recording layer, and then 12 nm thick second dielectric layer having the same $ZnS/SiO_2$ composition as the first one.

Next, it was disposed with the 4 nm thick barrier layer by RF sputtering with a target of 70% by weight of TiC incorporated with 30% by weight of $TiO_2$ to prevent reaction of Ag in the reflecting layer with a chalcogen component in the second dielectric layer, and then with the 140 nm thick reflecting layer of Ag.

Then, an overcoat layer formed of UV-curable resin is formed and disposed on the substrate having thickness of 0.6 mm and no groove so as to form an optical disk having a thickness of 1.2 mm.

The optical disk was subjected to initial crystallization by a high-output laser initialization apparatus (Phase-change optical disk initialization apparatus POP120-3Ra, Hitachi Computer Peripheries Co., Ltd.) under the conditions linear recording velocity: 2.5 m/second, travel: 36 μm and initial laser power: 850 mW following the initialization mode by CLV.

Next, the optical information recording medium prepared above was evaluated by a characteristic evaluation apparatus (Pulstec Industrial Co., Ltd.'s RW automatic evaluation system DDU-1000) equipped with a semiconductor laser emitting the beams of 650 nm wavelength.

First, its reflectivity was evaluated, where a 1400 Å thick, sputtered pure Ag film formed on a glass substrate was used as the control (reflectivity: 87.7%). It had a reflectivity of 21%, based on reflectivity of the control.

Next, the optical disk was provided with a mark equivalent with DVD 3 to 14T for the cyclic recording/rewriting test.

The evaluation conditions were clock frequency: 63.7 MHz, linear recording velocity: 8.5 m/second, and recording strategies of TSFP: 13 ns, TEFP: 19 ns, TMP: 6.5 ns and TLE: 12.5 ns.

The cyclic jitter was 6.7% as the initial level, and stable thereafter at around 8% to $1000.sup.th$ recording cycle. Modulation was 65% at the initial stage and 62% at 1000th recording cycle.

The medium was held in a high-temperature/high-humidity chamber kept at 80° C. and 85% RH for 400 hours, after it was checked for recorded information, to be tested again for jitter. The deteriorated extent was within an acceptable range: each of the initial level and level at 1000th cycle showed a decrease of 1% or less. The medium showed neither floated/separated films nor black spots considered to result from corrosion of the Ag reflecting layer.

Moreover, apart from the above optical disk, a single layer film of 10 nm was formed on a Si substrate using the above mixed target for the purpose of detecting composition ratio of carbide and oxide in the formed film. The film was measured its composition ratio of carbon and oxygen with an Auger electron spectroscope, i.e., Auger electron spectroscope SAM-660 of Ulvac-Phi, Inc. The measured oxide was 29% by weight, which was slightly less than the target composition thus it was found out that the formed film had substantially same composition to that of the target.

Specifically, the measuring method of the composition ratio was as follow. The sample was placed in the vacuum chamber of the Auger electron spectroscope, and the pressure within the chamber was reduced down to $2 \times 10^{-9}$ Torr. The element distribution of the sample was measured in the thickness direction thereof by Auger Electron Spectroscopy, while further reducing the pressure in the chamber. Here, the measuring under Auger Electron Spectroscopy was performed with: 10 kV of accelerating voltage of the electron gun; 1 μA of accelerating electrode of the electron gun; 2 kV of accelerating voltage of the ion gun; and 60° of incident angle of argon ion, and intermittent etching whose etching interval was 20 seconds was performed in the thickness direction of the sample using argon ion so as to measure the quantity of the elements. Further, with consideration of atomic ratio of carbon and oxygen relative to metal being 1:2, the unit of the result was converted to "% by weight" so as to unify the unit of the mixed composition of the target.

EXAMPLE 2

<Example for Forming the Barrier Layer with a Carbide Target in an Oxidative Atmosphere>

The barrier layer of carbide/oxide ($TiC/TiO_2$) mixture was prepared with a single TiC target in an oxidative atmosphere with Ar as the sputtering gas incorporated with oxygen at 5 to 20%, in place of the mixed target of carbide and oxide for RF sputtering in EXAMPLE 1. RF sputtering was also adopted, to prepare the optical disk in such a way that each layer had the same thickness as the corresponding one for the disk prepared in EXAMPLE 1.

The similar results were obtained. The cyclic jitter was 6.5% as the initial level, and stable thereafter at around 8% to 1000th recording cycle. Modulation was 66% at the initial stage and 63% at 1000th recording cycle.

Similarly, the medium was held in a high-temperature/high-humidity chamber kept at 80° C. and 85% RH for 400 hours, after it was checked for recorded information, to be tested again for jitter. The deteriorated extent was within an acceptable range: each of the initial level and level at 1000th cycle showed a decrease of 1% or less. The medium showed neither floated/separated films nor black spots considered to result from corrosion of the Ag reflecting layer.

EXAMPLE 3

<Example for Forming the Barrier Layer by DC Sputtering with a Carbide Target in an Oxidative Atmosphere>

An optical disk was prepared in the same manner as in EXAMPLE 2, except that a single carbide (ZrC) target having a resistivity of 0.003 Ωcm was used and the barrier layer was formed by DC sputtering in an oxidative atmosphere. The evaluation results were similar to those obtained in EXAMPLE 3.

In EXAMPLE 3 which adopted DC sputtering with a pulsed waveform, the tests were carried out, where ratio of time for which a voltage effective for film-forming was applied to the cathode was set at 65% of the total time. The similar medium characteristics were obtained, although the film-forming rate decreased as the time ratio decreased.

EXAMPLE 4

<Example for Forming the Blue-Structured Film with a Carbide Target in an Oxidative Atmosphere>

The substrate was a 1.1 mm thick polycarbonate plastic substrate, molded by a Ni stamper provided with groove information of the optical disk. It was disposed with the optical disk layers one by one by a magnetron sputtering apparatus for producing multi-layered film, provided with a film-forming chamber or a number of film-forming targets.

First, the plastic substrate was disposed with the 140 nm thick reflecting layer of Ag.

Next, it was disposed with the 4 nm thick barrier layer of carbide/oxide ($TiC/TiO_2$) by DC discharge sputtering under the same conditions as those for EXAMPLE 3 with a carbide (TiC) target in an oxidative atmosphere with Ar as the sputtering gas incorporated with oxygen at 3% to prevent reaction of the Ag layer as the reflecting layer with a chalcogen component in the second dielectric layer.

Next, it was disposed with the 8 nm thick second dielectric layer of $ZnS/SiO_2$ (70/30 by mol). The $SiO_2$ content was increased, known that optical constant k in the short wavelength region decreases as the content increases.

Next, it was further disposed with a 10 nm thick AgInGeSbTe layer ($Ag_{0.5}In_{0.5}Ge_{.4}Sb_{75}Te_{20}$) as the phase-change recording layer, and then 120 nm thick first dielectric layer having the same $ZnS/SiO_2$ composition as the second one.

After forming an overcoat layer formed of UV-curable resin, a cover film having a thickness was disposed thereon so that an optical disk having a thickness of 1.2 mm was finally formed.

Figure 3A:
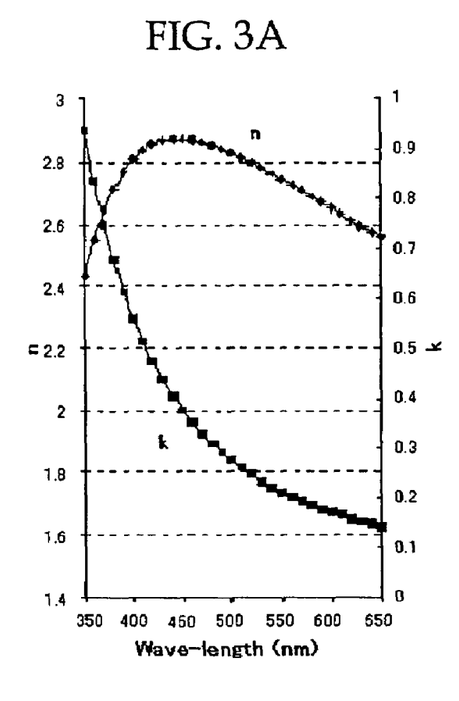
Figure 3B:
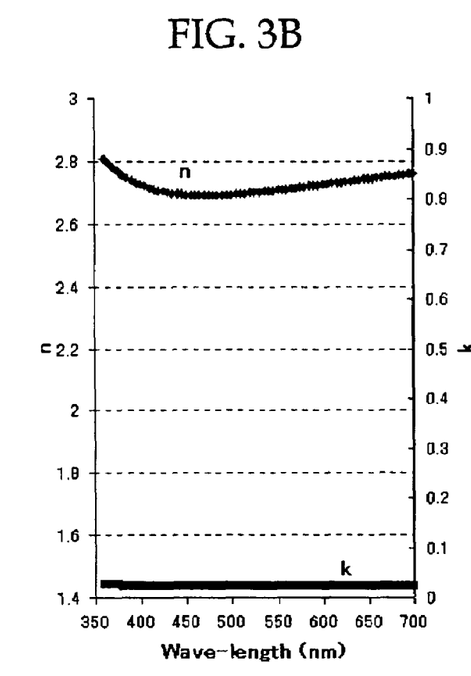

A film of carbide/oxide ($TiC/TiO_2$) mixture was separately prepared under the same conditions as those for forming the barrier layer, to evaluate its optical properties. The results are given in FIG. 3B.

The optical disk was subjected to initial crystallization by a high-output laser initialization apparatus (Hitachi Computer Peripheries Co., Ltd.'s phase-change optical disk initialization apparatus POP120-3Ra) under the conditions linear recording velocity: 3 m/second, feed rate: 36 μm and initial laser power: 600 to 650 mW following the initialization mode by CLV.

Next, the optical information recording medium prepared above was evaluated by a characteristic evaluation apparatus (Pulstec Industrial Co., Ltd.'s RW automatic evaluation system DDU-1000) equipped with a semiconductor laser emitting the beams of 405 nm wavelength and condensing lens (NA: 0.85).

First, its reflectivity was evaluated, where a 1400 Å thick, sputtered pure Ag film formed on a glass substrate was used as the control (reflectivity: 87.7%). It had a reflectivity of 20%, based on reflectivity of the control.

Next, the optical disk was provided with a mark at a density of 0.130 μm/bit for the cyclic recording/rewriting test.

The evaluation conditions were clock frequency: 66 MHz, linear recording velocity: 5.7 m/second, and recording strategies of TSFP: 1.77 ns, TEFP: 2 ns, TMP: 0.230 ns and TLE: 2.2 ns.

The cyclic jitter was 5.7% as the initial level, and stable thereafter at around 7.5% to 1000th recording cycle, determined by the aid of an equalizer. Modulation was 63% at the initial stage and 60% at 1000th recording cycle.

The optical information recording medium was held in a high-temperature/high-humidity chamber kept at 80° C. and 85% RH for 400 hours, after it was checked for recorded information, to be tested again for jitter. The deteriorated extent was within an acceptable range: each of the initial level and level at 1000th cycle showed a decrease of 1% or less. The medium showed neither floated/separated films nor black spots considered to result from corrosion of the Ag reflecting layer.

COMPARATIVE EXAMPLE 1

<Comparative Example with Respect to Deterioration by the Sulfur-Containing, Second Dielectric Layer and Ag Reflecting Layer>

An optical disk was prepared in the same manner as in EXAMPLE 1, except that no barrier layer was formed, and the second dielectric layer was formed in such a way to be as thick as the dielectric layer and barrier layer totaled. The disk prepared in COMPARATIVE EXAMPLE 1 was the same as that prepared in EXAMPLE 1 with respect to conditions under which they were prepared, materials and total thickness.

These disks showed the similar results with respect to initial jitter level, modulation and cyclic recording characteristics. However, the disk prepared in COMPARATIVE EXAMPLE 1 showed a number of corrosion-caused pinholes, when subjected to the high-temperature/high-humidity (exposure) test carried out under the same temperature and humidity conditions (80° C. and 85% RH) as in EXAMPLE 1 but for shorter 50 hours. The tested sample could not be checked for the recording medium characteristics.

COMPARATIVE EXAMPLE 2

<Example in which the Barrier Layer of Different Material was Formed as the Second Dielectric Layer, and Diffused into the Recording Layer>

An optical information recording medium was prepared in the same manner as in EXAMPLE 1, except that the 4 nm thick barrier layer was made of SiN.

The evaluation conditions were finely adjusted to be optimized for SiN, and the high-temperature/high-humidity test was carried out under the same conditions (80° C. and 85% RH), to follow the properties before and after the test. The medium could not be measured for jitter, when exposed to the above conditions for 400 hours.

Next, the medium was prepared in the same manner, except that thickness of the SiN barrier layer was doubled to 8 nm to improve the barrier effect, and reevaluated. The medium subjected to the high-temperature/high-humidity test increased in jitter by 3% every 100 testing hours, and was difficult to recognize the signal in 400 hours, because its jitter increased by more than 20%.

Thickness of the SiN barrier layer was conversely decreased to 2 nm. The resulting medium could not be measured for jitter in 100 hours, because of vanishment of the mark. It is judged, based on the above results, that SiN as a nitride is very low in sulfidation-resistant barrier effect.

COMPARATIVE EXAMPLE 3

<In the Case of Target Having a Resistivity of 0.5 Ωcm or More>

An attempt was made to prepare an optical disk by forming the barrier layer under the same conditions as those for EXAMPLE 3 expect that a target has a resistivity of 1.2 Ωcm. However, abnormal discharge frequently occurred to discontinue the film-forming process so that an optical disk was unable to prepared.

COMPARATIVE EXAMPLE 4

<Example for Forming the Blue-Structured Film with a Single Carbide Target (Including the Case of the Same Optical Thickness of the Barrier Layer)>

An optical disk was prepared in the same manner as in EXAMPLE 4, except a single SiC film was used as the barrier layer. Each layer had the same thickness as the corresponding one prepared in EXAMPLE 4, because the barrier layers had a similar refractive index and hence optically similar to each other. The resulting optical disk had a 1% lower refractive index of 18%, jitter of 6.2% (8% at 1000th cycle) and modulation of 62% (60% at 1000th cycle).

The optical information recording medium was held in a high-temperature/high-humidity chamber kept at 80° C. and 85% RH for 100 hours, after it was checked for recorded information. The tested medium showed black spots, conceivably resulting from corrosion of the Ag reflecting layer, and could not be measured for optical characteristics, e.g., jitter.

The optical disk with the 4 nm thick barrier layer failed to satisfy the characteristics normally required for optical disks, because it had a reflectivity decreased to 17%, jitter exceeding 9% and modulation of 60% or less.

A carbide (SiC) film was separately prepared under the same film-forming conditions as those for the barrier layer, and its optical properties were evaluated. The results are given in FIG. 3(a).

EXAMPLE 5

<Example for Establishing the Relationship Among Carbide Content of the Composition, Resistivity as a Representative Material Property and Film-Forming Process>

First, target resistivity was measured at a varying carbide content of the composition. The results are given in Table 1.

Those values given in Table 1 are for $ZrC/ZrO_2$ as a representative composition. The other 8 types of materials were measured in a similar manner. The results are given in FIG. 4. As shown, these compositions show similar trends.

Next, applicability of DC sputtering was investigated. The results are also given in Table 1.

Sputtering could be carried out only by RF type at a carbon content up to 15% by weight.

At a carbon content of 20% by weight or more, discharge could be achieved by DC pulse sputtering, but sputtering was no longer stable, because of abnormal discharge referred to as arcing sometimes occurring.

It is confirmed that the film can be formed by pulsed DC sputtering at a carbon content of 25 to 40% by weight, and by DC sputtering at 50% by weight or more whether it is pulsed or not.

In Table 1, the carbon content marked with ◎ in the column of DC sputtering applicability means that the composition can be formed into a film by DC sputtering at that carbon content, whether it is pulsed or not.

The pulsing conditions were pulsing time: 80% allocated to application of a negative voltage to the sputtering electrode and 20% to application of a plus voltage to prevent fine arcing, and applied pulse frequency: 100 kHz.

Next, film-forming rate was investigated. The results are given in Table 1.

The film-forming rate by RF sputtering was low at 0.1 to 0.2 nm/second·kW, or 0.7 to 0.9 nm/second·kW even at a high carbon content of 50 to 70% by weight.

In Table 1, the carbon content marked with ⊚ in the column of film-forming rate means that the composition can be formed into a film by DC sputtering at that carbon content, whether it is pulsed or not, at a preferable rate of 1.5 nm/second.multidot.kW or more, viewed from balanced production time among the production steps.

The carbon content marked with ○ means that the composition can be formed into a film at that carbon content at a rate of 0.5 nm/second·kW or more, which is acceptable for balanced production time in consideration of thickness of the barrier layer to be disposed.

FIG. 5 shows the relationship between film-forming rate and carbide composition for the mixed $ZrC/ZrO_2$ composition formed into a film by pulsed DC sputtering.

TABLE 1

| Carbide content of the composition (% by weight) | Resistivity (Ωcm) | Applicable range of DC sputtering | Film-forming rate |
|---|---|---|---|
| 0 | $10^7$ or over | (Only RF applicable) | X |
| 10 | $10^5$–$10^7$ | (Only RF applicable) | X |
| 15 | 4.2 | (Only RF applicable) | X |
| 20 | $6.8 \times 10^{-1}$ | Δ (Arcing occurring) | X |
| 25 | $2.3 \times 10^{-1}$ | ○ (Pulsed DC applicable) | ○ |
| 30 | $1.8 \times 10^{-1}$ | ○ (Pulsed DC applicable) | ○ |
| 40 | $8.4 \times 10^{-2}$ | ○ (Pulsed DC applicable) | ○ |
| 50 | $3.5 \times 10^{-2}$ | ⊚ | ⊚ |
| 60 | $1.5 \times 10^{-2}$ | ⊚ | ⊚ |
| 70 | $6.0 \times 10^{-3}$ | ⊚ | ⊚ |
| 80 | $4.0 \times 10^{-3}$ | ⊚ | ⊚ |
| 90 | $2.0 \times 10^{-3}$ | ⊚ | ⊚ |
| 100 | $1.7 \times 10^{-3}$ | ⊚ | ⊚ |

EXAMPLE 6

<Example for Varying Carbide/Oxide Compositions>

The optical information recording medium was prepared in the same manner as in EXAMPLE 1, except that the mixed target of TiC incorporated with 30% by weight of $TiO_2$ for forming the barrier layer was replaced by a mixed $ZrC/ZrO_2$ target of varying composition, and subjected to the high-temperature/high-humidity test. The results are given in Table 2.

No deterioration by the high-temperature/high-humidity test was observed for the medium whose barrier layer was prepared with the target containing the carbide at 90% by weight or more.

TABLE 2

| Carbide content of the composition (% by weight) | High-temperature/high-humidity test (80° C., 85% RH) results |
|---|---|
| 100 | Pinholes produced in 70 hours, Properties unmeasurable |
| 95 | Pinholes produced in 95 hours, Properties unmeasurable |
| 90 | Jitter increase by 1% or less in 200 hours, and by 2% in 400 hours |
| 80 | Jitter increase by 1% or less in 400 hours |
| 70 | Jitter increase by 1% or less in 400 hours |
| 60 | Jitter increase by 1% or less in 400 hours |
| 50 or less | Jitter increase by 1% or less in 400 hours |

EXAMPLE 7

<Example for the Phase-Change Recording Material of gete and $sb_2te_3$, Either Individual or in Combination>

The optical information recording medium was prepared in the same manner as in EXAMPLE 1, except recording layer of AgInSbTe was replaced by the layer of GeTe, $Sb_2Te_3$, or $GeSb_4Te_7$, $Ge_2Sb_2Te_5$ or $GeSb_2Te_4$, as a GeTe/$Sb_2Te_3$ mixtures, and subjected to the same tests.

Linear recording velocity was varying for each medium prepared, and information was recorded at 3 m/second as the common recordable level under the strategy optimized for each medium. Then, each medium was subjected to the high-temperature/high-humidity test.

The medium showed jitter increase by 1% or less in 400 hours and after, and neither floated/separated films nor black spots considered to result from corrosion of the Ag reflecting layer.

EXAMPLE 8

<Example for the Recording Material for the Recording Layer Formed of a Metallic Film of Cu, Cr or Ti>

The optical information recording medium was prepared in the same manner as in EXAMPLE 1, except that the recording layer of AgInSbTe was replaced by the layer formed of a metallic film of Cu, Cr or Ti, and subjected to the same tests.

Information was recorded at 3 m/second as the common recordable level under the strategy optimized for each medium. Then, each medium was subjected to the high-temperature/high-humidity test.

The medium showed jitter increase by 1% or less in 400 hours and after, and neither floated/separated films nor black spots considered to result from corrosion of the Ag reflecting layer.

EXAMPLE 9

<Example for the Carbide/Oxide Barrier Layers of Different Metals>

The optical information recording medium was prepared in the same manner as in EXAMPLE 1, except that the barrier layer was formed of a carbide/oxide mixture of various metals, with the carbide content set at the same level of 70% by weight as that of the layer prepared in EXAMPLE 1, as shown in Table 3. Each medium had the same structure for each layer as that prepared in EXAMPLE 1, except for the barrier layer.

Each medium was evaluated under the same conditions as those for EXAMPLE 1, to determine initial jitter.

A lower jitter level is more preferable. However, the level of 9% will cause no practical problem for an optical disk working at a wavelength of 650 nm. All of the media prepared in EXAMPLES, which have the barrier layer of carbide/oxide composition, are acceptable. The barrier layer formed of a carbide and oxide of Ti, Zr, Nb or Ta is more preferable, because it gives the medium having a jitter level less than 6%.

TABLE 3

| Sample ID | Barrier layer composition (carbide: 70% by weight) | Initial jitter level (%) | Evaluation |
|---|---|---|---|
| S-1 | TiC + TiO2 | 6.7 | ⊚ |
| S-2 | TiC + ZrO2 | 6.5 | ⊚ |
| S-3 | TiC + V2O3 | 8.5 | |
| S-4 | TiC + Nb2O5 | 6.8 | ⊚ |
| S-5 | TiC + Ta2O5 | 6.9 | ⊚ |
| S-6 | TiC + Cr2O3 | 8.5 | |

TABLE 3-continued

| Sample ID | Barrier layer composition (carbide: 70% by weight) | Initial jitter level (%) | Evaluation |
|---|---|---|---|
| S-7 | TiC + MoO2 | 8.5 | |
| S-8 | TiC + WO2 | 8.4 | |
| S-9 | ZrC + TiO2 | 6.7 | ◎ |
| S-10 | ZrC + ZrO2 | 6.6 | ◎ |
| S-11 | ZrC + V2O3 | 8.8 | |
| S-12 | ZrC + Nb2O5 | 6.7 | ◎ |
| S-13 | ZrC + Ta2O5 | 6.8 | ◎ |
| S-14 | ZrC + Cr2O3 | 8.7 | |
| S-15 | ZrC + MoO2 | 8.2 | |
| S-16 | ZrC + WO2 | 8.4 | |
| S-17 | VC + TiO2 | 8.5 | |
| S-18 | VC + ZrO2 | 8.7 | |
| S-19 | VC + V2O3 | 9.0 | |
| S-20 | VC + Nb2O5 | 8.6 | |
| S-21 | VC + Ta2O5 | 8.7 | |
| S-22 | VC + Cr2O3 | 8.9 | |
| S-23 | VC + MoO2 | 9.0 | |
| S-24 | VC + WO2 | 9.0 | |
| S-25 | NbC + TiO2 | 6.7 | ◎ |
| S-26 | NbC + ZrO2 | 6.8 | ◎ |
| S-27 | NbC + V2O3 | 8.7 | |
| S-28 | NbC + Nb2O5 | 6.8 | ◎ |
| S-29 | NbC + Ta2O5 | 7.3 | ◎ |
| S-30 | NbC + Cr2O3 | 8.7 | |
| S-31 | NbC + MoO2 | 9.0 | |
| S-32 | NbC + WO2 | 8.9 | |
| S-33 | TaC + TiO2 | 6.9 | ◎ |
| S-34 | TaC + ZrO2 | 6.7 | ◎ |
| S-35 | TaC + V2O3 | 8.9 | |
| S-36 | TaC + Nb2O5 | 6.5 | ◎ |
| S-37 | TaC + Ta2O5 | 6.8 | ◎ |
| S-38 | TaC + Cr2O3 | 8.8 | |
| S-39 | TaC + MoO2 | 8.9 | |
| S-40 | TaC + WO2 | 9.0 | |
| S-41 | Cr3C2 + TiO2 | 8.2 | |
| S-42 | Cr3C2 + ZrO2 | 8.3 | |
| S-43 | Cr3C2 + V2O3 | 9.0 | |
| S-44 | Cr3C2 + Nb2O5 | 8.3 | |
| S-45 | Cr3C2 + Ta2O5 | 8.2 | |
| S-46 | Cr3C2 + Cr2O3 | 8.5 | |
| S-47 | Cr3C2 + MoO2 | 8.9 | |
| S-48 | Cr3C2 + WO2 | 8.7 | |
| S-49 | MoC + TiO2 | 8.2 | |
| S-50 | MoC + ZrO2 | 8.2 | |
| S-51 | MoC + V2O3 | 8.8 | |
| S-52 | MoC + Nb2O5 | 8.1 | |
| S-53 | MoC + Ta2O5 | 8.2 | |
| S-54 | MoC + Cr2O3 | 8.7 | |
| S-55 | MoC + MoO2 | 8.9 | |
| S-56 | MoC + WO2 | 8.5 | |
| S-57 | WC + TiO2 | 8.3 | |
| S-58 | WC + ZrO2 | 8.1 | |
| S-59 | WC + V2O3 | 8.7 | |
| S-60 | WC + Nb2O5 | 8.4 | |
| S-61 | WC + Ta2O5 | 8.3 | |
| S-62 | WC + Cr2O3 | 8.9 | |
| S-63 | WC + MoO2 | 9.0 | |
| S-64 | WC + WO2 | 8.9 | |

As discussed above in detail and specifically, the optical information recording medium provided with the barrier layer formed of a mixture of carbide and oxide of at least one metal selected from Ti, Zr, V, Nb, Ta, Cr, Mo and W can solve the problems resulting from corrosion when the Ag-based material is used for the reflecting layer, has good disk characteristics which satisfy the requirements of high-speed linear recording velocity and high sensitivity, and is excellent in can-stability.

What is claimed is:

1. An optical information recording medium comprising:
   a substrate which is transparent;
   a first dielectric layer disposed above the substrate;
   a recording layer disposed above the first dielectric layer;
   a second dielectric layer disposed above the recording layer;
   a barrier layer disposed above the recording layer; and
   a reflecting layer disposed above the barrier layer,
   wherein the barrier layer contains a mixture of carbide and oxide, wherein the carbide is a carbide of at least one metal selected from Ti, Zr, V, Nb, Ta, Cr, Mo and W, and the oxide is an oxide of at least one metal selected from Ti, Zr, V, Nb, Ta, Cr, Mo and W, and
   wherein the mixture of carbide and oxide has a composition ratio of carbide to oxide being from 90/10 to 25/75 in terms of percent by weight.

2. The optical information recording medium of claim 1, wherein the barrier layer has a thickness of 2 nm to 10 nm.

3. An optical information recording medium, comprising:
   a substrate which is transparent;
   a first dielectric layer disposed above the substrate;
   a recording layer disposed above the first dielectric layer;
   a second dielectric layer disposed above the recording layer;
   a barrier layer disposed above the recording layer; and
   a reflecting layer disposed above the barrier layer,
   wherein the barrier layer contains a mixture of carbide and oxide, wherein the carbide is a carbide of at least one metal selected from Ti, Zr, V, Nb, Ta, Cr, Mo and W, and the oxide is an oxide of at least one metal selected from Ti, Zr, V, Nb, Ta, Cr, Mo and W, and
   wherein the recording layer contains a phase-change recording material which is formed of a film of metal selected from Cu, Cr and Ti.

4. The optical information recording medium of claim 3, wherein the recording layer is disposed adjacent the first dielectric layer.

5. The optical information recording medium of claim 3, wherein the barrier layer has a thickness of 2 nm to 10 nm.

6. The optical information recording medium of claim 1, wherein the recording layer is disposed adjacent the first dielectric layer.

* * * * *